No. 870,311. PATENTED NOV. 5, 1907.
G. OKAMOTO.
ROTARY PUMP.
APPLICATION FILED MAY 4, 1907.
2 SHEETS—SHEET 2.
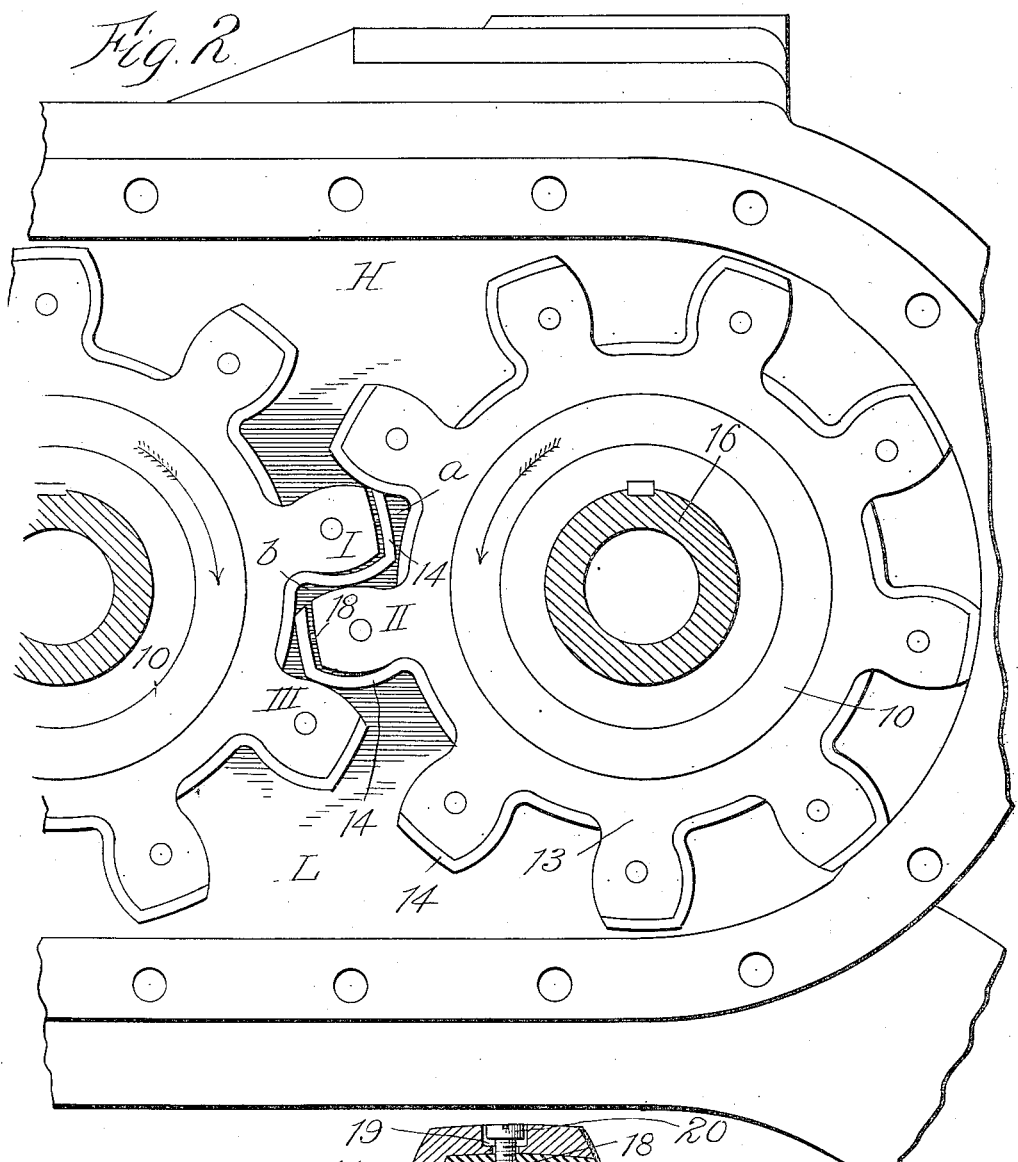
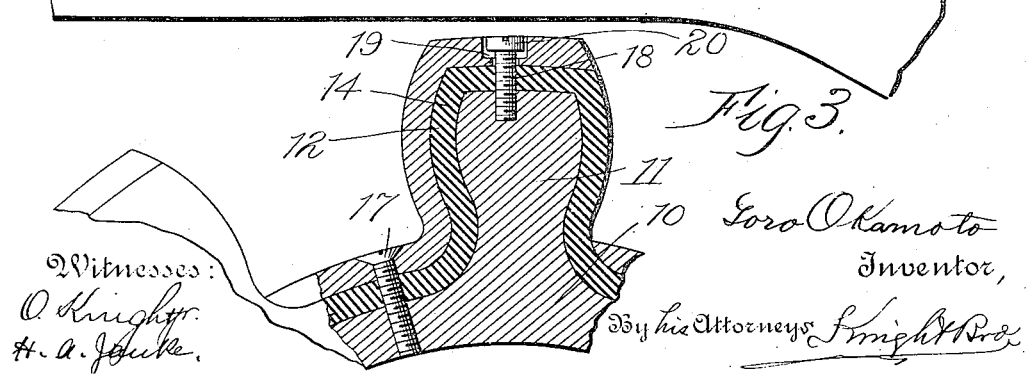

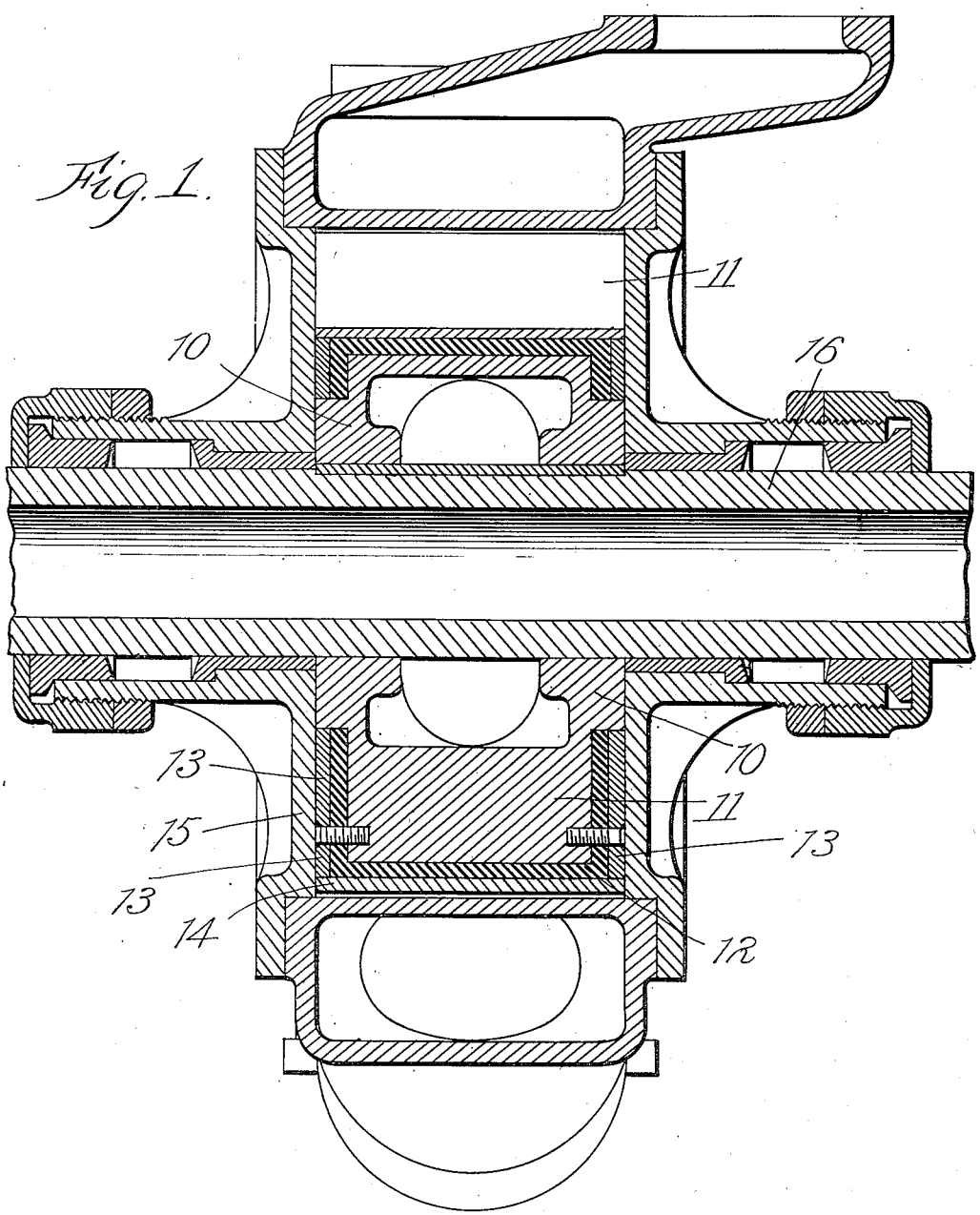

UNITED STATES PATENT OFFICE.

GORO OKAMOTO, OF NEW YORK, N. Y.

ROTARY PUMP.

No. 870,311.  Specification of Letters Patent.  Patented Nov. 5, 1907.

Application filed May 4, 1907. Serial No. 371,876.

*To all whom it may concern:*

Be it known that I, GORO OKAMOTO, a subject of the Emperor of Japan, and a resident of New York, in the borough of Manhattan, city, county, and State of New York, have invented a certain new and useful Improvement in Rotary Pumps, of which the following is a specification.

My invention pertains to an improvement in tightening the suction chamber in rotary pumps against the leakage from the high pressure chamber.

It is well known to tighten the engaging face surfaces and head surfaces of the teeth of the so-called pistons of rotary pumps by lining the same with an elastic material and to protect this material against wear by other suitable resistive material like, for instance, sheet metal of any suitable kind. The effect obtained thereby is, that the elastic material, compressed by the pressure of the engaging faces upon each other, will cause the engaging metal linings to bear evenly against each other throughout their line of contact, thus tightening the two chambers against leakage of the fluid to be conveyed by the pump. These means, however, are insufficient in many instances, since in most pumps of that kind the two rotors of the pump are preferably not driving one another directly by their engaging teeth, but are both driven from the outside by spur wheels fastened on their shafts. Therefore, the engaging metal surfaces of the piston teeth, owing to their wear in course of time, will not be any more sufficiently tightened by the elastic material, so that the pistons will become leaky. These disadvantages will be overcome entirely by the novel structure forming the subject matter of my application.

In the accompanying drawings—Figure 1 is a longitudinal vertical section through one piston of a rotary pump. Fig. 2 is an end view of the two pistons, the pump cover being removed. Fig. 3 is a cross section of one tooth in detail, showing more clearly the particular feature of my invention.

In Fig. 1 10 is one of the rotors or pistons of the pump suitably keyed to its hollow shaft 16 and provided with the teeth 11, of which one is shown in the upper half of the figure in view, in the lower half of the figure in longitudinal section. The face and the head of the teeth are lined with the elastic material 12 of any suitable kind, preferably rubber, and protected by sheet metal 13 and 14 of any suitable kind, plates 14 abutting against the walls of pump casing 15 parallel to the hollow shaft 16 of the piston, plates 13 abutting against the side walls of casing 15 running transverse to the piston shaft. As may be seen from Fig. 3, elastic material 12 covers also both engaging surfaces of the teeth 11, and metal lining 14 extends from the head of the teeth over the engaging surfaces on the side of the teeth toward which the piston revolves, and is fastened in the piston body 10 at the bottom of the interdental spaces by screws 17. Metal lining 14 is further secured to the heads of the teeth by means of screws 18 countersunk in recesses 19 provided in metal lining 14, so that when screws 18 are tightly screwed into the tooth heads enough play is left between the bottom of recess 19 and screw head 20 to allow metal lining 14 to be slightly lifted from the elastic lining 12, as shown in Fig. 2.

The purpose of this structure is the following: The two pistons 10, 10 rotate in the direction indicated by the arrows; thereby carrying from the high pressure chamber H a small quantity of the fluid to be conveyed, back to the low-pressure chamber L by means of the small interdental spaces a and b, through which in the ordinary rotary pumps used up to the present most of the leakage occurs. In these spaces the pressure will decrease from H toward L, space a having less pressure than chamber H, b less than a, and L less than b. Consequently, in the position of both pistons shown in Fig. 2 the fluid of the high pressure chamber H will lift metal lining 14 of tooth I, owing to the smaller pressure in space a, until it abuts tightly against the engaging surface of tooth II, and the fluid of space b having higher pressure than that of chamber L, will lift lining 14 of tooth II until it abuts tightly against the engaging surface of tooth III. Thus, it will be seen that the engaging surfaces of the teeth are tightened automatically by the pressure of the fluid tending to leak toward the low-pressure side of the pump, and this pressure will keep the engaging tooth surfaces tightened even when the metal lining is partly worn.

While I have shown in the drawings a structure by which the leakage may be prevented, I do not wish to limit my invention to this particular structure, as my invention comprises any tightening means provided on the teeth of the piston which are actuated by the difference in pressure between the high-pressure and the low-pressure side of the pump.

I claim:

In a rotary pump, having two gear wheels in mesh with each other for conveying fluid, elastic material on the engaging faces of the teeth of said gear wheels and a lining of resistive material protecting said elastic material, said resistive lining being disposed to be lifted by the difference of pressure in the pump when the teeth are engaging, to tighten the engaging surfaces of the teeth against leakage from the high-pressure side to the low-pressure side of the pump.

GORO OKAMOTO.

Witnesses:
MOTOSUKEE NAKAGAWA,
H. ALFRED JANKE.